JULIUS ALBERANI
RONALD J. SAVAGE
INVENTORS

BY Walter Patoraka, Jr.
John P. Moran
ATTORNEYS

United States Patent Office

3,365,883
Patented Jan. 30, 1968

3,365,883
GAS TURBINE ENGINE FUEL CONTROL
Julius Alberani, Birmingham, and Ronald J. Savage, Warren, Mich., assignors to Holley Carburetor Company, Warren, Mich., a corporation of Michigan
Filed May 19, 1966, Ser. No. 551,439
8 Claims. (Cl. 60—39.28)

ABSTRACT OF THE DISCLOSURE

This application discloses a fuel control device for a gas turbine engine having an air inlet and a pressurized source of fuel, the device comprising a housing having a first fuel inlet connected to the fuel source, a fuel outlet connected to the fuel inlet by a conduit controlled by a manually operated fuel valve, a second air inlet connected to the engine air inlet, a throttling valve in the fuel conduit upstream of the manually operated fuel valve for varying the pressure to the fuel valve, and first and second pressure responsive devices collectively responsive to the variable fuel pressure downstream of the throttling valve and to the varying engine air inlet pressure and engaging the throttling valve to regulate the position thereof.

---

This invention relates generally to gas turbine engines, and more particularly to fuel control mechanism therefor.

Applications are developing for relatively simple and inexpensive fuel controls for gas turbine engines. A typical application, merely by way of example, is a fuel control for a gas turbine engine powered aircraft known as a "target drone" which is intended to be fired from the ground or from the deck of some vessel such as an aircraft carrier and remotely controlled during flight as a simulated type aircraft target for gunnery practice by other vessels or aircraft and the like.

In most instances, the drone will be shot down; therefore, it and the fuel control are expendable, although if it is not shot down then it may be retrieved. Such target missiles are normally flown a predetermined altitude, 40–45,000 feet for example, and maneuvered at that altitude at varying speeds simulating the speed of an enemy aircraft. Since the remotely controlled flight is essentially at the predetermined altitude, the main control parameters are those that occur at that altitude.

In a typical application, the drone engine is provided with a governor which limits fuel supplied by the fuel control in order to prevent overspeeding and overheating of the engine. Additionally, the fuel system may include either a constant pressure fuel pump, or a pressurized fuel tank with a pressure regulator between the tank and the fuel control inlet.

Accordingly, a primary object of the invention is to provide a remotely controllable gas turbine engine fuel control mechanism that includes means for changing fuel flow in accordance with a remote power demand and altitude changes.

Another object of the invention is to provide such mechanism that is extremely simple in its construction and operation so as to be inexpensive, and yet reliable in operation.

Still another object of the invention is to provide a simple low cost manual fuel control biased by ram inlet air pressure, which varies with altitude.

Still another object of the invention is to provide a fuel control which will operate on fuel supplied by a constant pressure source, for example, either by a constant pressure pump or from a pressurized tank through a pressure regulator in order to maintain the fuel inlet pressure constant.

A still further object of the invention is to provide a fuel control capable of maintaining a constant pressure drop at a given compressor inlet or ram pressure, regardless of the fuel flow, across both the usual main fuel valve and the engine governor restriction when the governor is reducing the area of the restriction to reduce fuel flow to the engine.

Another object of the invention is to provide such a control which maintains the pressure drop across the main fuel valve constant at a given ram pressure, regardless of fuel flow.

Still another object of the invention is to provide such a fuel control wherein air intake ram pressure, which in particular instances is a function of the pressure immediately downstream of the governor restriction, is used as a control parameter.

Another object of the invention is to provide a control mechanism in which the remotely controlled manual power lever operates the main fuel valve between an open and a nearly closed position, the main fuel valve having a positive fuel shut-off valve associated therewith downstream from the main fuel valve.

A still further object of the invention is to provide such a fuel control having a throttling valve which is controlled by ram pressure and fuel pressure and positioned upstream of the main fuel valve, the throttling valve being adapted to come to an equilibrium condition upon the occurrence of a change in any of the operating parameters.

An additional object of the invention is to provide such a control which may have the throttling valve controlled by fuel pressures only, which are indicative of the pressure differential across the fuel valve, and still be able to automatically compensate for altitude.

Other objects and advantages of the invention will become more apparent when taken in conjunction with the following specification and the illustrations wherein.

Figure 1:
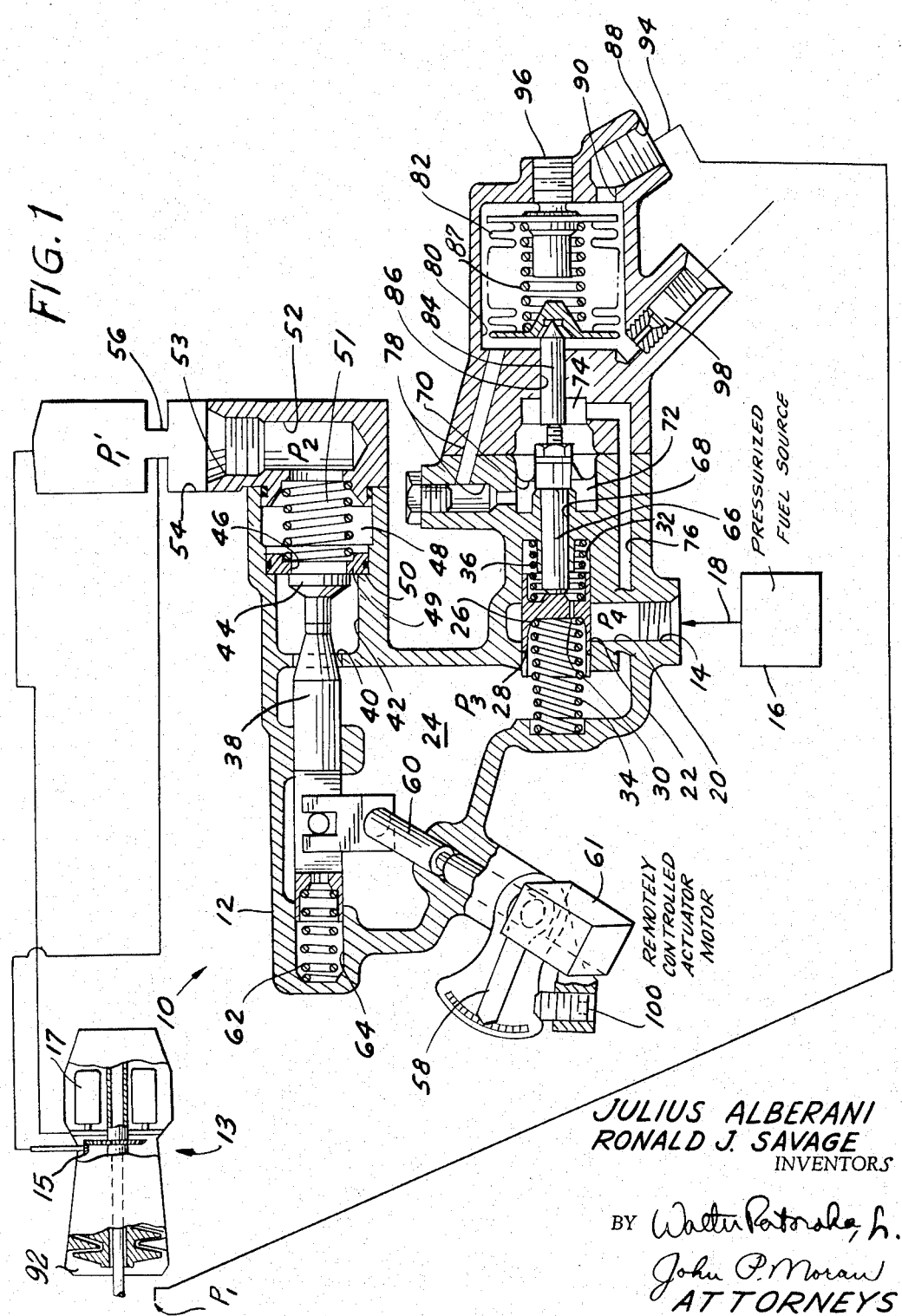
FIGURE 1 is a schematic illustration of a gas turbine engine fuel control mechanism embodying the invention.

Referring to the drawings in greater detail, FIGURE 1 illustrates schematically a fuel control mechanism 10, including a housing 12, which may be employed with a gas turbine engine, represented generally by 13. The fuel control 10 includes a fuel inlet 14 connected to any suitable source of fuel 16 via a conduit 18. The source 16 may consist of any constant pressure source, such as a pressurized tank which maintains a head for the fuel inlet pressure $P_4$ and an associated pressure regulator, or it may comprise any suitable constant pressure pump. A passage 20 terminating at 22 communicates between the inlet 14 and chamber 24. A throttling valve 26 controls communication between the passage 20 and the chamber 24 by means of a plurality of slots 28 formed in one end of the valve 26, the slots 28 being contoured to coordinate fuel flow with valve movement. A port 30 formed through the valve 26 communicates pressure in chamber 24 to chamber 32, and springs 34 and 36 in the chambers 24 and 32, respectively, urge the valve 26 toward a central position. As will be seen, the spring 36 may not be required.

A contoured main fuel valve 38 controls the area of an opening 40 formed between the chamber 24 and still another chamber 42. A flange 44 formed at the free end of the fuel valve 38 serves as a positive fuel shut-off valve by closing an opening 46 formed between the chamber 42 and an adjacent chamber 48. In the construction shown, the opening 46 is formed in an externally sealed ring-like member 49, the member 49 being urged against a step 50 formed between the chambers 42 and 48 by a spring 51 for a purpose to be described later. A passage 52 and an outlet 53 extend from the chamber 48 and communicate with a passage 54 leading to the governor portion of the engine 13, the passage 54 having a variable governor restriction 56 included therein, restriction 56 being regulated in accordance with engine speed by gear box 15.

The power or throttle lever 58 is pivotally connected to the fuel valve 38 by means of suitable linkage 60 which extends through a wall of the fuel control housing 12. In the target drone application, the lever 58 may be rotated by an actuator motor 61 which is controlled by suitable signals from a remote ground location. However, it will be apparent that a fuel control embodying the invention is not limited to such applications and that the lever 58 could be normally or otherwise operated. A spring 62 mounted in a chamber 64 against the end of the fuel valve 38 urges the valves 38 and 44 toward their closed positions relative to the openings 40 and 46, respectively. While the valve 44 may at times completely close, the fuel valve 38 is shaped such that it never completely closes.

A shaft or stem 66 is slidably mounted in an opening 68 formed in a wall of the fuel control housing 12 and extends into the chamber 32 where it abuts against the throttling valve 26. A diaphragm 70 secured to the outer end of the stem 66 serves as a movable wall between chambers 72 and 74 formed in the housing 12, and a passage 76 communicates between the chamber 24 and the chamber 74. Another passage 78 communicates between the chamber 72 and a chamber 80 containing an evacuated bellows 82, the latter being secured at one end thereof to a wall of the chamber 80. A second stem 84, slidably mounted through an opening 86 formed in a wall of the housing 12, extends between the movable end of the bellows 82 and the chamber 74 side of the diaphragm 70. The bellows may include an internal spring 87 in order to produce a predetermined system rate. Should the space which is available for the bellows 82 be such that the desired rate is not obtainable with the spring 87, the force thereof may be supplemented by the above mentioned optional spring 36.

An inlet 88 and passage 90 formed in the housing 12 lead to the chamber 80. A suitable pneumatic pressure, such as ram pressure $P_1$, is communicated from the air inlet of the engine 13, represented generally by 92, to the inlet 88 via a conduit 94, ram pressure $P_1$ being the total compressor inlet pressure.

An adjustment screw 96 may be provided to adjust the fixed end of the bellows 82, while a restricted opening 98 may be provided for the chamber 80, in order to serve as an overboard drain for any fuel which may leak past the stem 84 into the air chamber 80. An adjustable screw mechanism 100 may be provided adjacent the throttle valve 58 in order to serve as a maximum speed adjustable stop.

*Operation*

Let us first assume that fuel is being delivered to the engine via the inlet 14 and the passage 20, through the slots 28 of the valve 26, into the chamber 24, and thence past the valves 38 and 44 and through the chamber 48 and the outlet 53 to the governor passage 54, such that the closed loop system included in the fuel control 10 is in equilibrium position. This, of course, means that the rightward forces in FIGURE 1 acting upon the throttling valve 26, namely, the force of the spring 34, the pressure of the selected air in the chamber 72 against the diaphragm 70 and the difference in pressure across the evacuated bellows 82, are equal to the leftward forces, namely the force of the springs 36 and 87 and the fuel pressure within the chamber 74 against the right side of the diaphragm 70.

Figure 2:
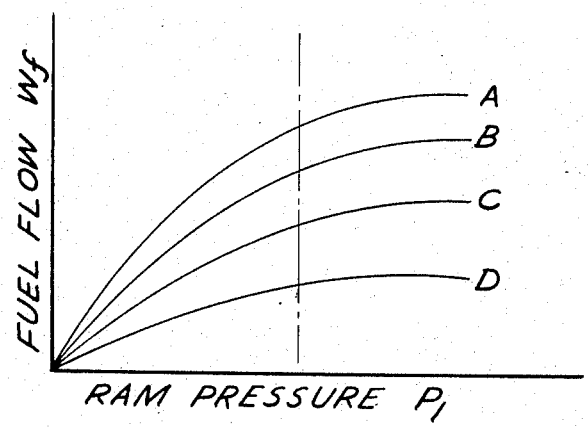
FIGURE 2 and FIGURE 3 are graphical illustrations of characteristics of the invention.
Figure 3:
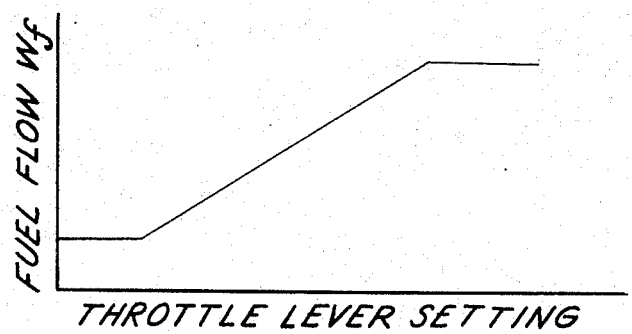

Referring now to FIGURE 2, it may be noted that, for the engine involved, a particular fuel flow vs. compressor inlet or ram pressure curve exists for each throttle lever setting, four such settings being represented by lines A, B, C and D. For any constant pressure $P_1$, fuel flow will vary lineally (FIGURE 3) with any changes in throttle lever setting. Pressure $P_1'$, downstream of the governor restriction 56 and communicated to the combustion chamber 17, is maintained at a constant percentage, say 95%, of the ram pressure $P_1$. This is due to the particular line losses through the engine involved. Where this is not true, a modified version of the fuel control 10 may be used and this will be discussed below in reference to FIGURE 4.

It is desirable that the total differential pressure across the last three restrictions in the fuel flow system, namely, restrictions 38/40, 44/46 and 56, remain constant at a particular compressor inlet or ram pressure $P_1$, whether speed is being changed by means of rotation of the throttle lever 58 or by a reduction in the flow area of the restriction 56 by the governor portion (not shown) of the engine 13. In other words, fuel flow will vary strictly with the flow area, so long as the pressure differential remains constant, in accordance with the well established flow formula, $W_f = KA\sqrt{\Delta P}$.

The valve 44 serves as a shut-off valve, i.e., once the throttle lever 58 is moved to the "zero" or off position, the spring 62 will move the valve 44 against the member 49 to close off the opening 46. To assure positive closing, the member 49 is contacted by the valve 44 just before the lever 58 reaches the zero position, thus causing the spring 51 to become compressed slightly. The valve 38 is contoured such that it never contacts the edge of the opening 40. This is important in order to prevent any damage to the accurately machined contoured surface. Once the engine is started and the valves 38 and 44 are retracted, the opening 44/46 supplements the opening 38/40, the two openings together serving as a predetermined restriction to the fuel flow.

By way of illustration, let us now assume that the throttle lever 58 is moved in the increasing speed direction, thereby increasing the restricted flow areas 38/40 and further opening the valve 44/46. This will initially decrease the pressure differential $P_3 - P_1$, and, so long as $P_1$ remains constant, the result will be a lower valve of $P_3$. Since $P_3$ acts on the diaphragm 70 via the passage 76 and the chamber 74, the reduced closing force on the throttling valve 26 will permit the spring 34 to urge the valve to the right (FIGURE 1) or in the opening direction. Consequently, there will result an increased fuel flow to the engine, increasing the pressure differential $P_3 - P_1$. The increased $P_3$ will once again act to close the throttling valve 26 by moving the slotted openings 28 leftward, until the forces on the valve 26 are again in equilibrium, thus returning the differential $P_3 - P_1$ to its original value.

Now, let us assume that $P_1$ increases, due to a change in altitude. The immediate effect is to increase the rightward force on the diaphragm 70, since $P_1$ will have increased in the chamber 72. This will increase the fuel flow opening 28/22 and thereby increase the flow to the engine, as well as increase the pressure in the chamber 74, serving to once again bring the system into equilibrium at the higher fuel flow level, and at a higher $P_3 - P_1$ value. The evacuated bellows 82 serves to refer the altitude changes to absolute zero.

Should the engine speed reach the predetermined 100% speed point where the governor begins closing the governor restriction 56, the immediate effect is an increase in the pressure differential $P_3 - P_1$, which, as explained above, will be reflected across the diaphragm 70. The resultant increased closing force on the valve 26 will move it leftward, reducing the opening 28/22 and, hence, once again reducing the pressure differential $P_3 - P_1$ and the pressure $P_3$ in chamber 74, bringing the system back into an equilibrium condition.

Figure 4:
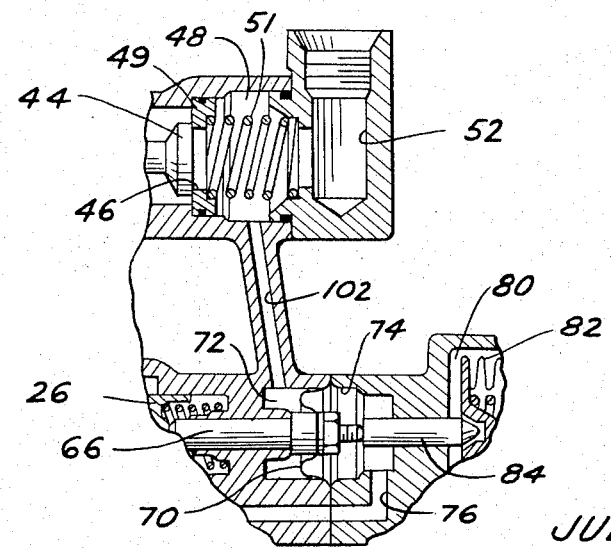
FIGURE 4 is a fragmentary schematic illustration of a modification of the invention.

Referring now to FIGURE 4, it may be noted that the invention may be modified by the addition of a passage 102 communicating between the chambers 48 and 72 in place of the passage 78 (FIGURE 1) located between the chambers 80 and 72. As such, it is the pressure differential $P_3-P_2$ which is being maintained at a constant value while $P_1$ is held constant, $P_2$ being the pressure immediately downstream of the valve 44. In this instance there would either be no governor on the engine 13 or the governor would be serving as an overspeed protector, instead of constituting a 100% speed control system, as is the case in the previously described structure of FIGURE 1. In such an application, the fuel passage 102 is preferred to the air passage 78, resulting in a safer diaphragm 70 arrangement. Specifically, there would be fuel on both sides of the diaphragm, rather than fuel on only one side and air on the other. The latter condition could prove hazardous should the diaphragm 70 ever become ruptured. Altitude changes would still be reflected across the bellows 82 and influence the throttling valve 26 through the stems 84 and 66. In comparing the FIGURE 1 design with the FIGURE 4 modification, it is noted that bellows 82 and diaphragm 70, taken collectively, are responsive to the variable fuel pressure $P_3$ and air pressure from inlet 92.

While the $P_1$ or altitude parameter is desirable even in many ground gas turbine engine driven vehicle applications, such as on a truck, for example, which may travel through areas of varying altitude, if it were desirable for any reason, the $P_1$ signal could be indicative of any other parameter, such as compressor discharge pressure, etc.

It should be apparent that the invention represents a simplified and, hence, inexpensive and yet highly reliable expendable fuel control mechanism which may be used in remotely controlled, or "drone," target application, or any other gas turbine engine application, such as on a truck, for example.

While but two embodiments of the invention have been shown and described, it is apparent that other modifications of the invention are possible within the scope of the appended claims.

What we claim as our invention is:

1. A fuel control mechanism for a gas turbine engine having a source of fuel under pressure and a source of air under variable pressure, comprising a housing, a first and second inlet in said housing, an outlet in said housing, said source of fuel and source of air being connected to said first and second inlets, respectively, a single conduit in said housing communicating said first inlet and flowing all of the fuel from said source, a fuel valve in said conduit, a throttle valve in said conduit upstream of said fuel valve for varying the fuel pressure to said fuel valve, first and second pressure responsive means engaging said throttle valve, said means being collectively directly responsive to said variable fuel and air pressures.

2. A fuel control for a gas turbine engine having a source of air under variable pressure, a source of fuel under pressure and a governor controlling a variable fuel restriction, said control comprising a fuel valve controlling flow of fuel from said source to said engine, and means for varying said fuel pressure upstream of said fuel valve, said means including a throttle valve and first and second pressure responsive means engaging said throttle valve for movement thereof, said last-mentioned means being responsive to said variable fuel and air pressures for maintaining a constant pressure differential between said variable fuel and air pressures at a given air pressure.

3. A fuel control such as that recited in claim 2, wherein a fuel shut-off valve is formed on an extension of said fuel valve.

4. A fuel control such as that recited in claim 2, including, additionally, remote control means for moving said fuel valve.

5. A fuel control such as that recited in claim 2, wherein said first pressure responsive means includes a diaphragm subjected on one side to said variable fuel pressure and on the other side to said variable air pressure.

6. A fuel control such as that recited in claim 2, wherein said second pressure responsive means includes an evacuated bellows responsive to said variable air pressure for automatically changing fuel flow in response to changes in altitude.

7. A fuel control such as that recited in claim 2, wherein said source of air under variable pressure is total compressor inlet pressure.

8. A fuel control for a gas turbine engine having a variable pressure air source, a pressurized fuel source and a governor controlling a variable fuel restriction, said control comprising a housing, a first fuel inlet for connection to said fuel source and connected by a conduit to a fuel outlet supplying said variable fuel restriction, said conduit flowing all of the fuel from said source to said engine and being controlled by a fuel valve therein, said fuel valve including a fuel shut-off valve for said conduit formed on an extension thereof, remote control means for moving said fuel valve, a throttle valve in said conduit upstream of said fuel valve for varying the fuel pressure to said fuel valve, a second inlet for connection to said variable pressure air source, first and second pressure responsive means controlling said throttle valve by physical engagement therewith, said first pressure responsive means including a movable diaphragm subjected on one side to said variable fuel pressure and on the other side to said variable air pressure, said second pressure responsive means including an evacuated bellows responsive to said variable air pressure for automatically changing fuel flow in response to changes in altitude, said throttle valve and said first and second pressure responsive means maintaining a constant pressure differential between said variable fuel and air pressures at a given air pressure.

References Cited

UNITED STATES PATENTS

| | | | |
|---|---|---|---|
| 2,693,081 | 11/1954 | Russ | 60—39.28 |
| 2,705,047 | 3/1955 | Williams et al. | 60—39.28 X |
| 2,736,166 | 2/1956 | Mock | 60—238 X |
| 2,753,882 | 7/1956 | Bottoms | 60—39.28 X |
| 2,796,136 | 6/1957 | Mock | 60—39.28 X |
| 2,882,680 | 4/1959 | Jamison et al. | 60—39.28 |
| 3,032,986 | 5/1962 | Wright | 60—39.28 |

JULIUS E. WEST, *Primary Examiner.*